(12) United States Patent
Orlowski

(10) Patent No.: US 6,311,984 B1
(45) Date of Patent: Nov. 6, 2001

(54) BEARING ISOLATOR

(75) Inventor: David C. Orlowski, Milan, IL (US)

(73) Assignee: Inpro Companies, Inc., Rock Island, IL (US)

( * ) Notice: Subject to any disclaimer, the term of this patent is extended or adjusted under 35 U.S.C. 154(b) by 0 days.

(21) Appl. No.: 09/110,102

(22) Filed: Jul. 2, 1998

Related U.S. Application Data

(63) Continuation-in-part of application No. 08/701,815, filed on Aug. 21, 1996, now abandoned.

(51) Int. Cl.$^7$ ........................................... F16J 15/16
(52) U.S. Cl. .................... 277/418; 277/412; 277/419; 277/420
(58) Field of Search .................... 277/412, 418, 277/419, 420

(56) References Cited

U.S. PATENT DOCUMENTS

| | | | |
|---|---|---|---|
| 1,562,019 | * 11/1925 | Wilkinson | 277/56 |
| 4,526,388 | * 7/1985 | Marshall | 277/206 |
| 4,743,034 | * 5/1988 | Kakabaker | 277/56 |
| 5,125,480 | * 6/1992 | Gregory et al. | 184/6.26 |

* cited by examiner

Primary Examiner—Anthony Knight
Assistant Examiner—Enoch E. Peavey
(74) Attorney, Agent, or Firm—Rockey, Milnamow & Katz, Ltd.

(57) ABSTRACT

The improved bearing isolator permits the use of vapor or a combination of a vaporized substance with a carrier to lubricate bearings while containing the vaporized substance in the housing and permitting the carrier, having been stripped of its substance, to escape to the atmosphere. This novel coalescing unit also has a positive coalescence both during operation and at static condition. This invention will retain the vaporized substance in the housing after coalescence so that it may be reclaimed or reused as desired. The novel coalescing unit of this invention may be utilized with any seal assembly which will prevent or minimize the escape of the lubricant in liquid form from the housing, the coalescing member separate the mist from the carrier and coalesces the substance of the vapor to be retained within the housing.

43 Claims, 5 Drawing Sheets

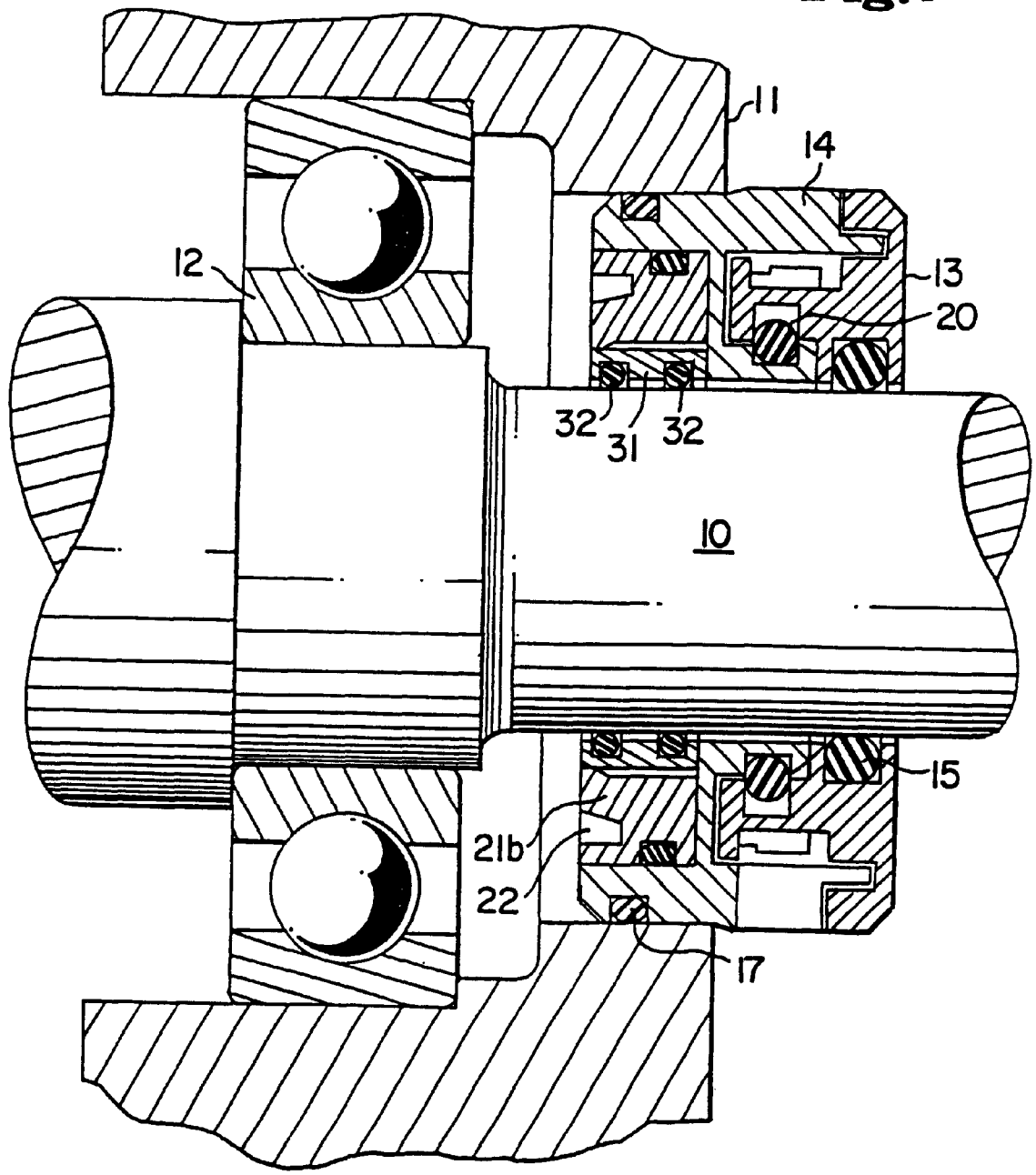

BEARING ISOLATOR

This invention is a continuation in part of my improvement over my bearing isolator described and claimed in U.S. patent application Ser. No. 08/701,815 filed Aug. 21, 1996 abandoned and the continuation filed Sep. 10, 1997.

BACKGROUND OF THE INVENTION

The prior art and description of these applications including the drawings and the resulting improvements are added herein for complete disclosure is shown in the original application. This further improvement is shown in newly submitted FIGS. 6 and 7 and is the best mode now known.

The oil mist lubrication systems and the problems associated with the prior art still exist. The retention of the oil in the housing utilizing the oil mist system is novel. Prior art searches show no oil mist control systems which separate the mist after injection into the bearing housing to prevent escape of the mist into the atmosphere.

The oil mist coalescing system of this invention operates on the identical principles of the original disclosure and application, however, this best mode insures optimum drive engagement of the rotating member, desired coalescing action by controlling the engagement between the coalescing member and the rotating member, and by the ability to vary as necessary or desirable the amount of coalescing surface exposed to rotation and therefore utilize to the maximum the coalescing action.

Oil mist lubrication has been widely used in the Hydrocarbon Processing and Primary Metal industries as a means of delivering a constant supply of fresh lubricant directly to the bearings of various types in order to enhance the reliability of the rotating equipment.

Oil mist systems continuously provide a fresh supply of oil film to the bearings, pressurize the bearing housing against outside contaminants and cool the bearings slightly. A mist generator in which petroleum or synthetic lubricant is made into a fine aerosol mist of droplets, measuring 3–5 microns in size, is mixed with carrier air. The mixture is delivered by means of pipes, conduits, and tubings and is delivered automatically under low pressure to the bearing housing. Previously, a volume of air is continuously exhausted into the workplace area and the air contains oil mist, creating a back pressure in the bearing housing equal to the exit losses incurred. The disadvantage of known oil mist lubrication system is the constant escape of air/oil mist. This is often termed "stray mist" which permeates the entire area around and on the exterior surface of the misted equipment.

This stray mist or oil accumulation in the air has been taken care of in an environmental sense by proper ventilation and use of good mistable lubricants to reduce the amount of stray mist to a low level. However, there is always a significant amount of stray oil mist that escapes and is deposited on the surfaces in the workplace despite the best ventilation systems.

Government agencies, namely the Environmental Protection Agency (EPA), has tolerated the mist in the environment because it has not been proven to be harmful when ingested into the human body through inhalation, ingestion, or skin absorption. The most common way is inhalation and the National Institute of Occupation Safety and Health in the United States has established a threshold limit of oil mist in the air as 5 mg. per cubic meter. However, concentrations greater than 0.4 mg. per cubic meter result in a visible haze or cloud of mist, which accumulates on the equipment and surrounding structures, especially the floor, which renders this equipment slippery and unsafe in many ways. In any event, this oil must be cleaned-up and the oily residue disposed of in an environmentally safe manner which requires a great deal of time and money.

This constant loss of oil and the requirements of cleaning it up necessitated a method of providing the advantages of oil mist lubrication without the disadvantages, i.e., loss of oil through the stray mist emitted into the surrounding environment.

Applicant's invention will implement the retention and control of oil mist in a housing. This implementation would prevent any visible emission, such as fog, steam, mist, etc., or would be operable with a gas at a temperature below its critical temperature and/or for retention in the housing of the combination of a aerosol mist substance in air or other carriers. In many instances, such control is needed, such as to prevent steam from entering into a housing containing oil or a substance, such as oil in a second aerosol form.

Applicant's invention has been found to provide absolute control over oil mist or oil droplets escaping into the atmosphere along with the air carrier.

SUMMARY OF THE INVENTION

In order to prevent the escape of the lubricant from a bearing housing, this invention controls the mist and coalesces the mist aerosol into a liquid form. This liquid form may be drained into a bearing enclosure sump or other means of accumulating the oil and then removed to waste and/or recovery.

This invention provides for absolute control of the mist lubrication system or any other aerosol system, including a combination of a aerosol substance and a carrier, by retaining all of the oil or other aerosol substance contained in the mist within the bearing enclosure. The carrier or air, absent the aerosol substance, may escape the housing.

Any labyrinth seal, but preferably a seal which limits the axial movement between the rotor and stator of the seal may be utilized. The rotor may be driven by any normal drive means with the shaft about which the rotor is situated. The stator member is firmly sealed to the housing or vessel, which in the case of oil mist may enclose the bearing member. This invention provides a groove in the stator surrounding the shaft with a coalescing member inserted into this groove. The coalescing member is necessarily lubricous. A virgin Teflon® cord or ring placed into the collection groove in the stator within the housing works excellently. This collection or coalescing member is sized and positioned so as to be in intimate contact or "wear-in" contact with the rotating shaft. The coalescing member either wears or sublimates or abrades to within line-to-line or zero dimensional contact with the shaft. When the mist or vapor containing the oil or other vaporized substance impinges or encounters the coalescing member-to-shaft interface, the oil or other aerosol substance coalesces. This coalesced liquid may drip off or be deposited into drain grooves which drain and run to a sump. Because there is no frictional engagement between the coalescing member and the shaft, there is no wear to the coalescing surface after initial "run-in". The life of the coalescing member is extended indefinitely due to this lack of wear.

The use of a coalescing member on a seal also controls loss of fluid when there is a non-pressurized oil lubricant provided in the housing for the bearings. The lubricant will normally be contained within the bearing housing and this seal will improve such containment. The coalescing member acts in the same manner to prevent the escape or travel of the oil along the shaft past the coalescing member.

The sides of the groove in the stator may be at right angles to the shaft. However, it has been found that to have one side, normally the side of the groove away from the exit of the shaft through the housing, at a slant from the perpendicular improves the coalescence and the flow return of the coalesced liquid or oil.

It has also been found that the addition of a second coalescing member or ring in a second groove located further away from the bearing along the shaft toward the exit of the shaft from the housing will improve the efficiency of coalescing of the oil mist and act as a further barrier to the escapement of oil along the shaft.

Further modifications of this invention include the addition of a third groove located further away from the bearing with a coalescing member or ring in the first and third grooves with the second groove being an open groove.

The above improvements are also operable with any aerosol vapor or combination of non-superheated vaporized substance with a carrier coalescing and retaining any substance in a vessel while the gaseous carrier may escape.

DESCRIPTION OF THE DRAWINGS

FIG. 7—is a sectional view showing in detail the assembly of the coalescing member in the housing including rectangular coalescing member and the rotating member.

DETAILED DESCRIPTION OF A PREFERRED EMBODIMENT OF THE INVENTION

Figure 1:
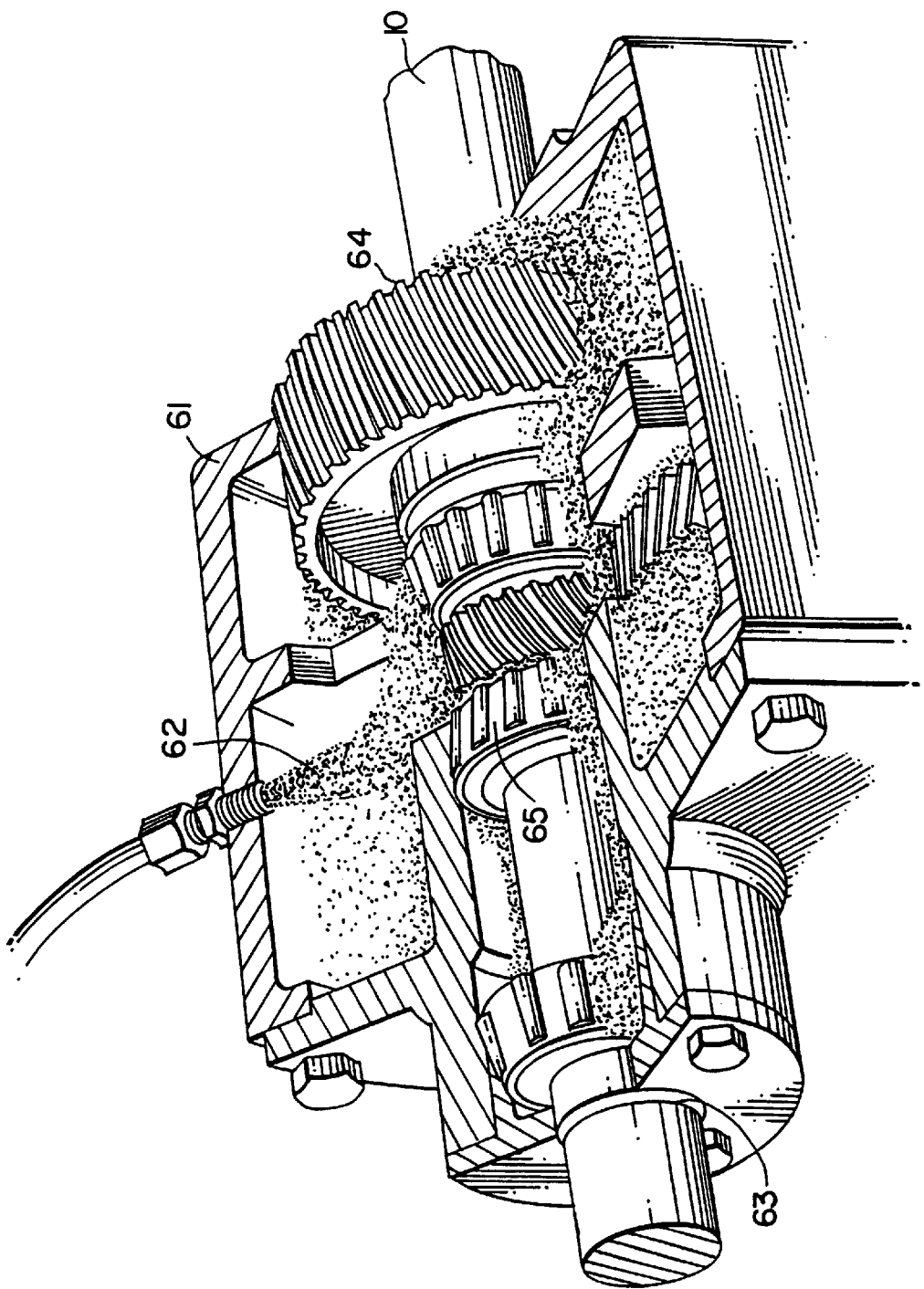
FIG. 1—is a plan view of the prior art showing an oil mist lubrication system without this invention.

The prior art is shown in FIG. 1 consisting of housing 61, a source of oil mist 62, the bearings 65, and a shaft 10. This oil mist as depicted flows in and around the bearings and gears, which are not enumerated, and escapes around the shaft at 63 and 64. The oil mist in the air carrier is then released to the atmosphere.

Figure 2:
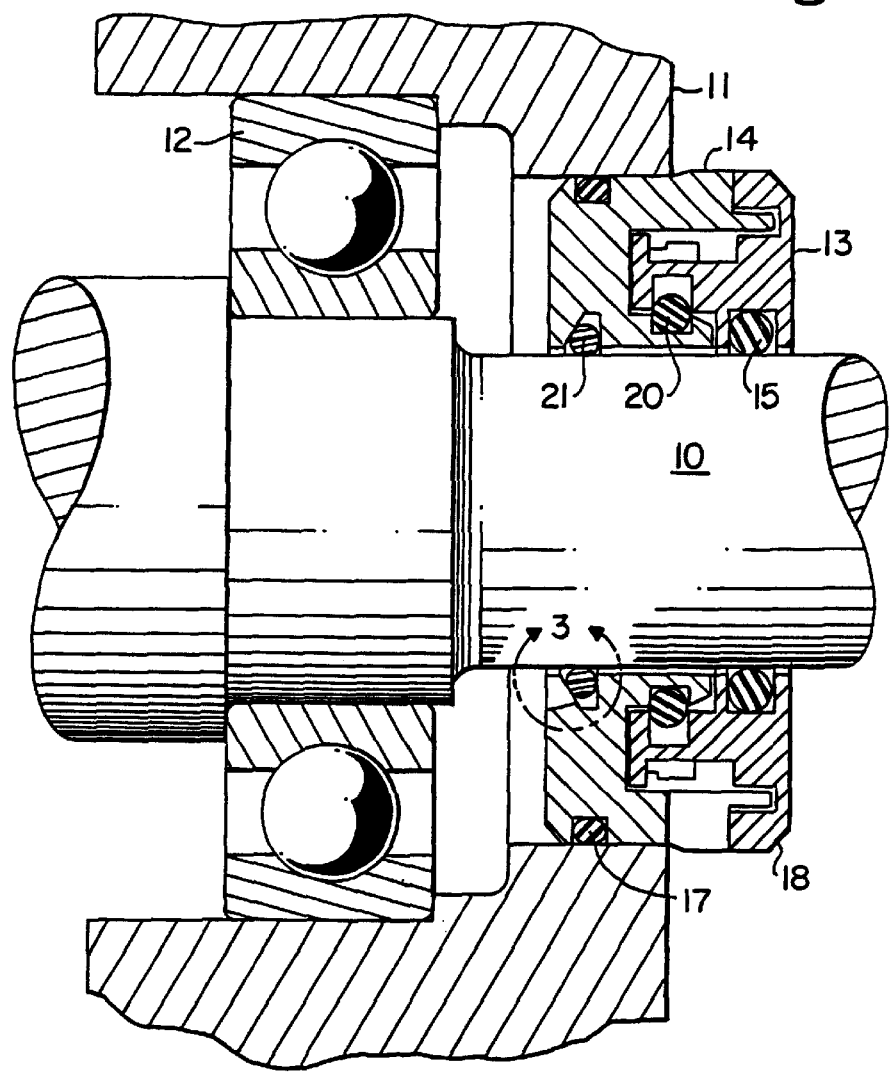
FIG. 2—is a sectional view showing in detail the assembly of the seal into the housing, including the rotor and stator.

Referring now to FIG. 2. There is shown the novel seal of this invention mounted on shaft 10. The shaft 10 protrudes through the isolator 18, the housing 11, and the bearing 12. The novel seal of this invention is shown with the stator 14 and the seal 17 holding the isolator in position. The stator ring 13 is affixed to the shaft 10 by means of the frictional seal 15. The rotor ring 13 follows the rotational movement of the shaft 10 because of the frictional engagement of the seal 15. The seal, except for the novel members to be discussed later, may be any labyrinth type seal, though the one shown herein is described in detail in U.S. Pat. No. 5,378,000 in cols. 2–3. The labyrinths and passages of this particular seal are fully described in the referenced patent.

Figure 3:
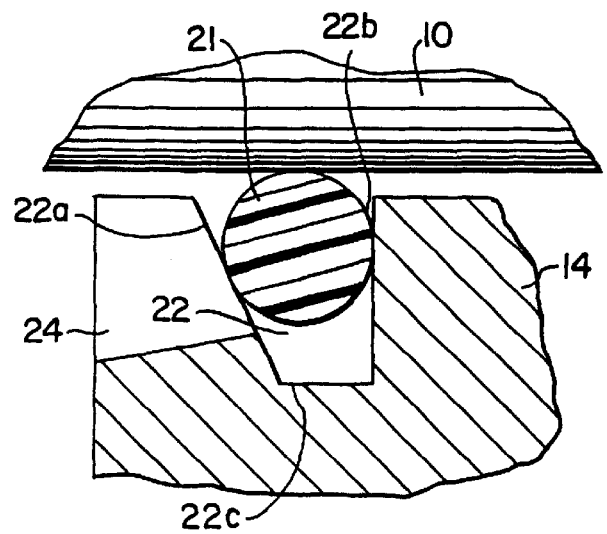
FIG. 3—is an expanded view of section 3 in FIG. 2.
Figure 4:
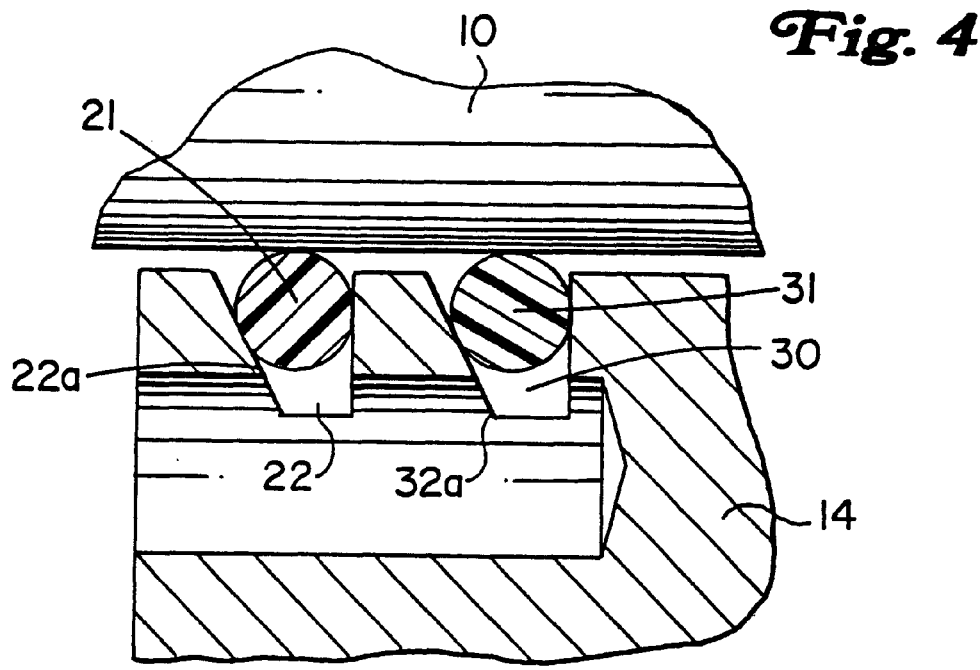
FIG. 4—is an expanded view of a second embodiment of this invention with two grooves in the stator.
Figure 5:
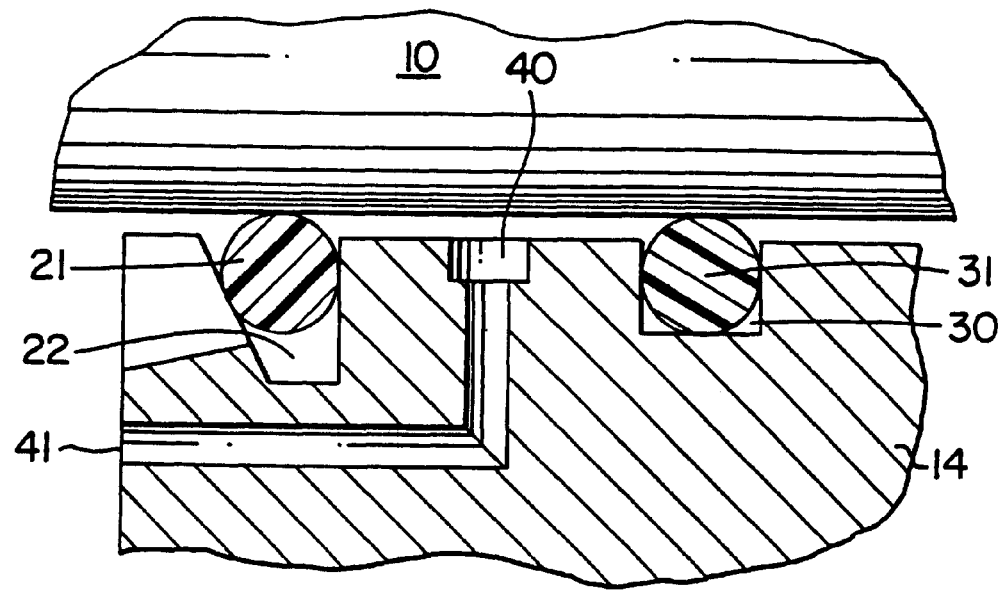
FIG. 5—is an expanded view of a third embodiment of this invention with three grooves in the stator.

The novelty of this invention is shown in FIG. 2, but is best described by references to FIGS. 3, 4, and 5. As shown in FIG. 2, the seal 18 is in position in the cavity or housing 11 and sealed by the sealing elements 17. A groove member or groove 22 is cut in the stator member 14. This groove cavity 22 surrounds the shaft 10. A coalescing member 21 is inserted into this groove 22. Groove 22 is connected to the sump of the housing 11.

As shown, the coalescing members or materials 21, which may be made of virgin PTFE or any other material which is both lubricous and which will sublimate to coalesce the vaporized substance contained in the vapor. This coalescing material is firmly inserted into the groove 22. The coalescing member or material is in slight contact with the shaft 10 and will "wear-in" or subliminate exactly to the shaft surface i.e., less than 3–5 microns. The groove 22 may be rectangular, a preferred embodiment is shown in FIG. 3 where the groove 22 includes an angled side 22a, the other sides of the groove 22 are 22b and bottom is 22c.

Thus, there is provided a larger sump or retention area 24 for the coalesced material to accumulate prior to being drained off.

As shown in FIG. 4, there may be a second coalescing ring or a barrier ring 31. The addition of this second coalescing ring will improve the retention of the coalesced material within the housing 11. This barrier ring 31 also helps to prevent the escape of the coalesced material to the atmosphere from the housing 11. This second groove 30 may also be rectangular or may include the sloping surface 32a on one side of the groove 30 similar to that shown in groove 20.

As shown in FIG. 5, there may be also a third groove cut in the stator 14. This groove 40 would normally remain open and provide an extra collection and return for the oil or coalesced material. The coalesced material would normally be coalesced at surfaces 32a or 22a. Any coalesced solid material which gets past the first coalescing material ring 21 would travel along the shaft 10 and be further coalesced or combined with the barrier ring 31 of coalescent material. Thus, any oil or coalesced material between 21 and 31 would drain into the center groove 40.

This invention would also be useful as a secondary seal to prevent mixtures of two separate fluids contained on two sides of the seal. In this case only one side would contain the vapor or combination of a vaporized substance with a carrier, while the other side could, i.e., have a fluid in a solid state. In any such utilization the housing containing the vapor or vaporized substance with a carrier would be the housing to which the seal was affixed as shown in FIG. 2. The novel seal would prevent the commingling of the vaporized substance or the coalesced substance and the solid substance or fluid on the other side of the seal.

Figure 6:
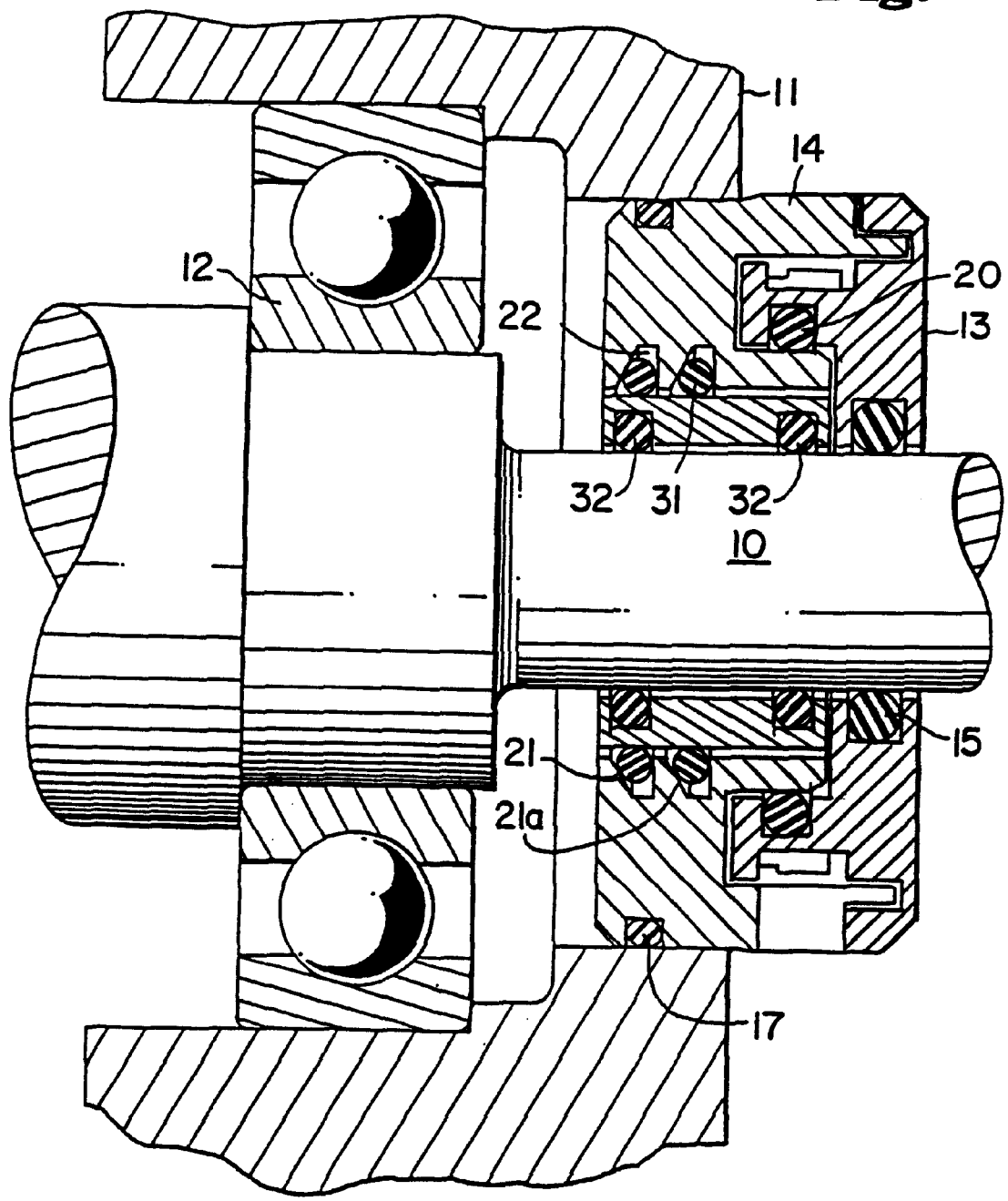
FIG. 6—is a sectional view showing in detail the assembly of the seal into the housing including the coalescing member and the rotating member set out.

Referring now to FIG. 6. FIG. 6 shows the novel coalescing unit of this invention mounted on shaft 10. The shaft 10 protrudes through the isolator 18, the housing 11 and the bearing 12. The seal associated with this invention includes the stator 14 and the seal 17 holding the bearing isolator in position. The seal except for the novel coalescing unit is describe above.

This permutation of the invention includes a sled or rotating member 31. This rotating member 31 is actually sized to occupy as much of the available length of the stator 14 as possible. Two drive rings 32 drive the member 31 when the shaft 10 is rotated. The rotating member 31 will rotate as the shaft rotates against the coalescing rings 21 and 21a and will come to a precise fit between the rotating member and the coalescing member which is called zero-zero (0—0) dimension or interference fit.

The oil mist contacts the coalescing members 21 or 21a and the coalescing action caused by the rotating of the member 31 against the coalescing members 21 and 21a changes the mist into its two component parts ie. the substance and the carrier. In the case as shown in FIG. 6 the first coalescing ring 21 will remove or coalesce most of the mist, with the liquid oil falling into the cavity 22 to be drained away to a sump in a well known manner. The second ring 21a will act as a scavenger and coalesce any mist which may escape the first coalescing ring with the remaining substance or oil being removed from the carrier air and the air proceeding to escape past the drive member 15.

Referring now to FIG. 7 the coalescing member has now been formed as a wedge or rectangular member 21b. This wedge of material is also formed of coalescing material such as Rulon® and must be as hard as possible but still possessing less hardness than the rotating member 31. This results in the abrasion of the coalescing member to a zero-zero (0—0) interference fit at which point the molecules contained in the mist are coalesced into larger droplets by the friction and/or the motion including air currents between the rotating member and the coalescing member. In this embodiment the coalescing action will continue across coalescing member 21b. The oil or substance will again be drained off in a well known manner and the air or carrier will be permitted to pass to atmosphere past the drive mechanism 15. A slot can be formed in the coalescing member to facilitate two stage coalescence as described above.

This novel coalescing unit prevents the escape of the vaporized substance including the solid substance coalesced yet allows reduction of the carrier to atmospheric pressure and exit on the other side of the seal.

Having described the preferred embodiment other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A coalescing seal for a shaft exiting housing having pressurized mist lubrication to the shaft including:
   a) a housing;
   b) a shaft extending through said housing;
   c) a seal having a rotor and a stator affixed to said housing surrounding said shaft;
   d) a mist consisting of a pressurized carrier and a aerosol substance injected into said housing;
   e) a coalescing seal in said housing comprising:
      1) a first member of hard lubricous capable of sublimation material;
      2) a second member of durable material harder than said lubricous capable of sublimation material;
      3) said first and second members rotatable relative to each other;
      4) said first and second members contained within said stator and originally in interference contact with each other;
      5) said first member abraded by said second member from the relative rotation of said first and second members to an interference fit;
      6) said first member fixed;
      7) said second member rotated with the rotation of said shaft;
   f) said mist separated upon contact with said first and second members into said carrier and said substance.

2. The invention in accordance with claim 1 wherein said first member is an annular member.

3. The invention in accordance with claim 2, wherein said air can exit said housing between said shaft and said sublimated lubricous material.

4. The invention in accordance with claim 1 wherein said first member is a rectangular member.

5. The invention in accordance with claim 1 wherein said second member is said shaft.

6. The invention in accordance with claim 1 wherein said second member is a separate axially extending rotor affixed to said shaft for rotation.

7. The invention in accordance with claim 6 wherein said second member has rotor drive rings dispersed axially along said shaft.

8. The invention in accordance with claim 7 wherein said axially spaced drive rings maintained said first and second members with an interference fit of 3–5 micron dimension.

9. The invention in accordance with claim 1 wherein said second member is a radially extending rotor member affixed to said shaft.

10. The invention in accordance with claim 9 wherein said first member is radially oriented to said shaft.

11. The invention in accordance with claim 1, wherein said first member is a plurality of axially spaced coalescing rings.

12. The invention in accordance with claim 11, wherein a groove is cut between said coalescing rings forming a path for the coalesced substance.

13. The invention in accordance with claim 1 wherein said carrier is air and said substance is oil.

14. The invention in accordance with claim 1, wherein said substance after coalescence is removed form housing.

15. The invention in accordance with claim 1 wherein said carrier is dissipated from said housing into the atmosphere.

16. The invention in accordance with claim 1, said vapor consisting of a combination of vaporized substance and a dry gaseous carrier.

17. A seal for a shaft exiting a housing including:
   a) a housing;
   b) a shaft extending through said housing;
   c) a seal affixed to said housing and surrounding said shaft;
   d) pressurized vapor in said housing;
   e) said seal comprising:
      1) a stator affixed to said housing;
      2) a rotor rotating with and surrounding said shaft;
      3) labyrinths between said rotor and said stator, at least one groove in said stator surrounding said shaft adjacent said shaft; and
   f) sublimated lubricous material in said groove in face to face contact with said shaft to prevent passage and coalesce the solid material from the carrier to said vapor.

18. The invention in accordance with claim 17, wherein said groove is rangular in shape.

19. The invention in accordance with claim 14, where said groove has one side angled with respect to the radius of said groove.

20. The invention in accordance with claim 17, wherein said stator has two grooves therein.

21. The invention in accordance with claim 20, wherein said the first and third grooves are filled with said lubricous material capable of sublimation.

22. The invention in accordance with claim 20, wherein the first and third grooves have one side angled with respect to the radius of the grooves, and the second groove is rectangular in shape.

23. The invention in accordance with claim 17, wherein said sublimated lubricous material is Teflon®.

24. The invention in accordance with claim 23, wherein said dry gaseous carrier can exit said housing between said shaft and said sublimated lubricous material.

25. The invention in accordance with claim 17, wherein said stator has three grooves adjacent said shaft, only the first and third grooves filled with sublimated lubricous material.

26. The invention in accordance with claim 25, wherein the first and third grooves are angled with respect to the radius of the groove and the second groove is rectangular in form.

27. The invention in accordance with claim 26, wherein said first and third grooves filled with material capable of sublimation.

28. The invention in accordance with claim 25, wherein said exiting airflow forms a barrier to the entry of contamination.

29. A seal for a shaft exiting a housing including:
   a) a housing;
   b) a shaft extending through said housing;
   c) a seal affixed to said housing and surrounding said shaft;
   d) vapor in said housing, said vapor consisting of a pressurized combination of vaporized substance and air;
   e) said seal comprising:
      1) a stator affixed to said housing;
      2) a rotor rotating with and surrounding said shaft;
      3) labyrinths between said rotor and said stator, at least one groove in said stator surrounding said shaft adjacent sad shaft; and
   f) sublimated lubricous material in said groove in intimate contact with said shaft to prevent passage and coalesce said material in said vapor.

30. The invention in accordance with claim 29, wherein said vaporized substance in said housing or said bearing is an oil mist.

31. The invention in accordance with claim 29, wherein said groove is rectagular in shape.

32. The invention in accordance with claim 31, wherein said grooves are rectangular in form.

33. The invention in accordance with claim 31, wherein said grooves include a first groove which is sloped from the horizontal, and a second groove which is rectangular in form.

34. The invention in accordance with claim 33, wherein said first and third grooves are filled with lubricous material capable of sublimation.

35. The invention in accordance with claim 31, wherein said stator includes two grooves where both grooves are sloped with reference to the radius of the groove.

36. The invention in accordance with claim 29, wherein said grove has one side angled with respect to the radius of groove.

37. The invention in accordance with claim 29, wherein said sublimated lubricous material is a derivative of Teflon®.

38. The invention in accordance with claim 37, wherein said exiting dry carrier forms a residual pressure barrier to the entry of contamination.

39. The invention in accordance with claim 29, wherein said stator has two grooves.

40. The invention in accordance with claim 39, wherein said two grooves have sides perpendicular to said shaft.

41. The invention in accordance with claim 39, wherein said first groove is sloped with respect to said shaft and the second groove has a side perpendicular to said shaft.

42. The invention in accordance with claim 39, wherein said stator has two grooves and each groove is angled with respect to axis of said shaft.

43. The invention in accordance with claim 29, wherein said stator has first, second, and third grooves therein.

* * * * *